H. JOHNSON.
MEANS FOR GAGING OR MEASURING TILES.
APPLICATION FILED APR. 29, 1911.
1,013,396.
Patented Jan. 2, 1912.
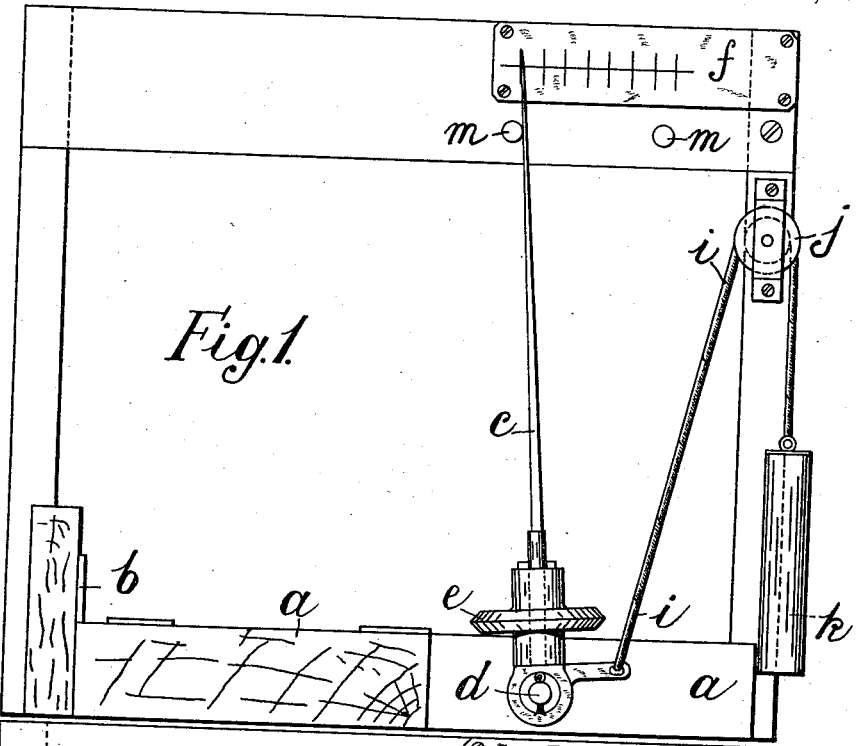
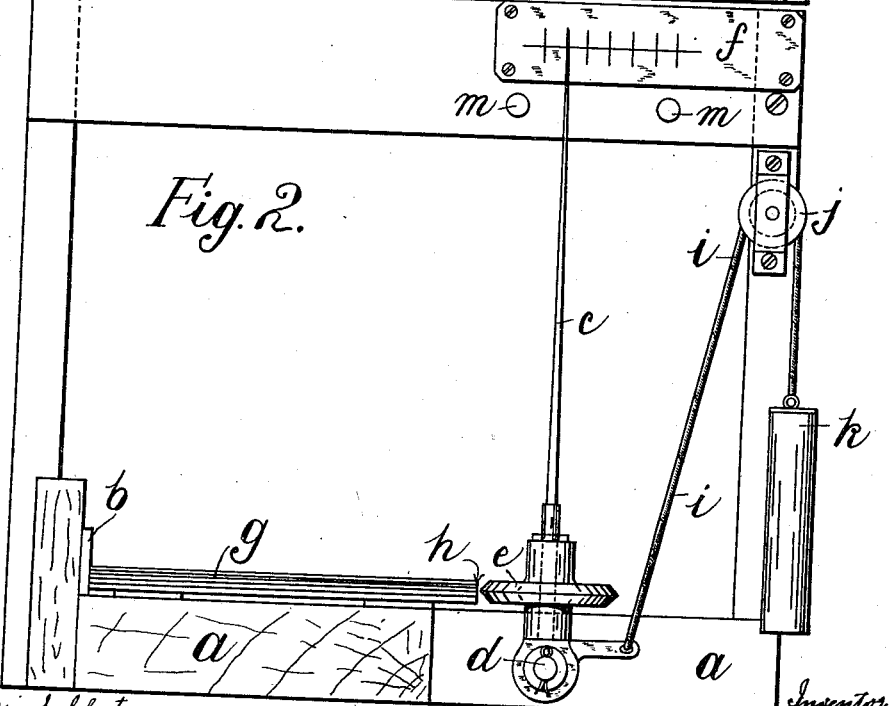

UNITED STATES PATENT OFFICE.

HARRY JOHNSON, OF NEWCASTLE-UNDER-LYME, ENGLAND.

MEANS FOR GAGING OR MEASURING TILES.

1,013,396. Specification of Letters Patent. Patented Jan. 2, 1912.

Application filed April 29, 1911. Serial No. 624,096.

*To all whom it may concern:*

Be it known that I, HARRY JOHNSON, subject of the King of Great Britain and Ireland, and resident of Newcastle-under-Lyme, in the county of Stafford, England, tile manufacturer, have invented certain new and useful Improved Means for Gaging or Measuring Tiles, of which the following is a specification.

My invention relates to means employed for measuring tiles during the course of manufacture so as to enable them to be sorted out and each size assembled together. This is rendered necessary since during the manufacture of the tiles the contraction of the material of which they are composed varies according to the temperature at which they are fired so that an ordinary, say, six inch tile may vary considerably, the difference in size either above or below the standard measurement may be $\frac{1}{8}$ of an inch or more.

Prior to the date of my invention tiles have been sized into various lots by being matched with standard sizes of tiles or with standard sizes of gages each varying to the extent of $\frac{1}{32}$ of an inch. This is a slow process and at the same time is not efficient since it depends upon the judgment of the person sizing the tiles as to whether he actually sorts them out properly. Mechanical devices have also been employed for the same purpose as my invention which is designed to produce a different mechanical arrangement to that already employed and one which will obviate all the disadvantages of the gaging process previously referred to.

My invention will be fully described with reference to the accompanying drawings in which, Figure 1 is a front elevation of a device constructed in accordance with my invention in which the tile is not present while Fig. 2 is a similar view showing the actual measurement of a tile.

In accordance with my invention I employ a base $a$ or frame of any suitable size, having at one side a raised rib $b$ against which one edge of the tile can be placed. The other side of the base is provided with a pivoted finger or pointer $c$, mounted on a stud $d$ secured to the base. The pointer has mounted on it a knife-edged disk $e$. Any other approved form of gage member besides the disk $e$ may be used. I, however, usually employ a knife-edged disk the extreme ridge of which enables a more accurate measurement to be obtained than would be the case were the edge of the disk parallel with the axis of the pointer, though I would have it understood that a disk with such an edge, or with a more or less rounded edge, may be employed. In the case of any of the forms of disks referred to being employed they may be mounted loosely on the pointer so that they may turn around freely and cause equal wear of the edge all around but otherwise they are a close fit on the finger or pointer. The extreme end of the latter is arranged to operate in front of a stationary graduated scale $f$ so that when a tile $g$, as in Fig. 2, is placed on the base $a$ and pushed against the raised rib $b$ it can be measured by pushing the wheel or disk $e$ against the outer edge $h$ of the tile when the pointer will indicate on the scale $f$ the classification to which the tile belongs.

I may employ in conjunction with the pointer $c$ means for turning it and its disk or projection normally in the direction of the tile on the base. Such means may consist in a weighted cord $i$ passing over a pulley $j$ one end of the cord being connected to the pivoted portion of the pointer while the other end is coupled to a suitable weight $k$. Or the boss of the pointer, or the pointer arm, may be coupled to a spring adapted to act in the direction previously referred to. Projections $m$ may be arranged on the frame of the device to limit the movement of the point in either direction.

From the foregoing description it will be understood that the essential feature of my invention consists in the use of a pivoted movable pointer operating in conjunction with a graduated scale marked to indicate the various sizes of tiles.

What I claim as my invention and desire to secure by Letters Patent is:—

A gaging machine for tiles, comprising a frame having at its lower part a support for the tiles to rest on, a stationary gage member projecting above the said support at one side thereof, a pointer pivoted to the lower part of the frame on the other side of the said support and projecting upwardly and adapted to be grasped by the hand, a gage member carried by the said pointer, a scale on the upper part of the frame adjacent to the free end of the pointer, and means for moving the pointer automatically toward the edge of a tile placed on the support between the gage members, said pointer being adapted to be retracted by hand while the tile is being placed in position or being removed from the said support.

In testimony whereof I have hereunto set my hand in the presence of two witnesses.

HARRY JOHNSON.

Witnesses:
P. PLANT,
G. BENTON.

Copies of this patent may be obtained for five cents each, by addressing the "Commissioner of Patents, Washington, D. C."